United States Patent
Wepfer

(10) Patent No.: US 10,378,514 B2
(45) Date of Patent: Aug. 13, 2019

(54) WIND TURBINE INSTALLATION HAVING A TOWER CONSOLE

(71) Applicant: WEPFER TECHNICS AG, Berg-Dägerlen (CH)

(72) Inventor: Hans Wepfer, Berg-Dägerlen (CH)

(73) Assignee: WEPFER TECHNICS AG, Andelfingen (CH)

( * ) Notice: Subject to any disclaimer, the term of this patent is extended or adjusted under 35 U.S.C. 154(b) by 313 days.

(21) Appl. No.: 14/443,274

(22) PCT Filed: Nov. 15, 2013

(86) PCT No.: PCT/CH2013/000201
§ 371 (c)(1),
(2) Date: May 15, 2015

(87) PCT Pub. No.: WO2014/075201
PCT Pub. Date: May 22, 2014

(65) Prior Publication Data
US 2015/0292488 A1 Oct. 15, 2015

(30) Foreign Application Priority Data
Nov. 16, 2012 (CH) ........................ 2425/12

(51) Int. Cl.
*F03D 9/25* (2016.01)
*F03D 7/04* (2006.01)
(Continued)

(52) U.S. Cl.
CPC ............... *F03D 7/043* (2013.01); *F03D 1/02* (2013.01); *F03D 3/02* (2013.01); *F03D 9/25* (2016.05);
(Continued)

(58) Field of Classification Search
None
See application file for complete search history.

(56) References Cited

U.S. PATENT DOCUMENTS 2,388,377 A * 11/1945 Albers ................ F03D 1/02
290/55
2,511,023 A   6/1950 Thomas
(Continued)

FOREIGN PATENT DOCUMENTS

DE    44 32 800 A1    3/1996
DE    4432800 A1 *   3/1996 ............. E02D 27/42
(Continued)

*Primary Examiner* — Jason D Shanske
*Assistant Examiner* — Theodore C Ribadeneyra
(74) *Attorney, Agent, or Firm* — Birch, Stewart, Kolasch & Birch, LLP

(57) ABSTRACT

The present invention relates to wind turbine installations for power generation. The wind turbine installations comprise a turbine support with at least two wind turbines. Furthermore, a wind turbine installation according to the invention comprises a tower console with at least one bearing point. Said bearing point permits a rotational movement of the turbine support about the vertical axis of the turbine support and relative to a foundation. The turbine support is connected to the tower console by means of tower pillars. The installation furthermore comprises electronics which comprise an electronic controller. The electronics are furthermore designed so as to be rotatable about the vertical axis of the turbine support relative to the foundation and relative to a power transmission cable.

8 Claims, 1 Drawing Sheet

(51) Int. Cl.
  *F03D 3/02*    (2006.01)
  *F03D 13/20*   (2016.01)
  *F03D 1/02*    (2006.01)
  *F03D 80/80*   (2016.01)

(52) U.S. Cl.
  CPC ............ *F03D 13/20* (2016.05); *F03D 13/22* (2016.05); *F03D 80/85* (2016.05); *Y02E 10/728* (2013.01)

(56) References Cited

U.S. PATENT DOCUMENTS

| | | | | |
|---|---|---|---|---|
| 4,110,631 A | * | 8/1978 | Salter | F03D 1/02 290/55 |
| 2008/0111379 A1 | * | 5/2008 | Altemark | F03D 7/0204 290/44 |
| 2009/0196748 A1 | * | 8/2009 | Salter | F03D 1/02 416/120 |
| 2009/0267038 A1 | * | 10/2009 | Teichert | B66D 1/38 254/335 |
| 2010/0087960 A1 | * | 4/2010 | Hayashi | F03D 7/0204 700/287 |
| 2010/0230967 A1 | | 9/2010 | Heo | |
| 2011/0037272 A1 | * | 2/2011 | Moritz | F03D 1/02 290/55 |
| 2011/0076146 A1 | * | 3/2011 | Falcone | F03D 1/02 416/120 |
| 2011/0084491 A1 | * | 4/2011 | Kassner | F03D 80/00 290/55 |
| 2011/0254283 A1 | * | 10/2011 | Ollgaard | F03D 80/85 290/55 |
| 2012/0051939 A1 | | 3/2012 | Marvin et al. | |

FOREIGN PATENT DOCUMENTS

| | | | |
|---|---|---|---|
| DE | 10 2006 015 561 A1 | 10/2007 | |
| EP | 0 102 657 A1 | 3/1984 | |
| EP | 1 788 242 A1 | 5/2007 | |
| EP | 1788242 A1 * | 5/2007 | ........... E04H 12/085 |
| JP | 2011-032918 A | 2/2011 | |
| JP | 2011-106274 A | 6/2011 | |
| WO | WO 2010/098813 A1 | 9/2010 | |
| WO | WO 2010098813 A1 * | 9/2010 | ............... F03D 1/02 |

* cited by examiner

WIND TURBINE INSTALLATION HAVING A TOWER CONSOLE

TECHNICAL FIELD

The present invention relates to a wind turbine installation for power generation.

PRIOR ART

Large, single-rotor wind turbine installations have long been known which, when erected at suitable sites, convert the energy of the wind into electrical energy and feeds said electrical energy into a power network. Said wind turbine installations are between 50 and 200 meters tall, and where possible, have rotor diameters of over 90 meters. Owing to their enormous height, the shadows cast by such wind turbine installations are also particularly large. The installations themselves can hardly be overlooked in the landscape, and also exhibit a high level of noise emissions owing to the considerable rotor diameter. For this reason, particularly large installations are preferably installed at remote locations or even offshore, that is to say at sea.

Even though the social acceptance for renewable energies and "clean" energy sources is high, it is however the case specifically with wind turbine installations that residents and landscape conservation groups generally oppose the construction of new installations. Aside from the disadvantages with regard to acceptance by the population, large wind turbine installations can be installed only in restricted locations because, owing to their large rotor diameters, they exhibit a considerable moment of inertia, and thus efficient wind power utilization is not efficiently possible at sites with fluctuating wind conditions and heights. To be able to better utilize fluctuating wind conditions, it is known for wind turbine installations to be equipped with a wind tracker. This wind tracking may be realized for example by way of a yaw controller which permits adaptive wind tracking of the nacelle in order that the latter is optimally aligned relative to the wind at all times. A sensor arrangement signals the wind direction to the controller, which then operates control motors as required.

In order to make the wind turbine installations more broadly socially accepted at the same time, it is possible to reduce the overall height of the installation. In the case of such installations, one cannot avoid the need to increase the number of turbines in order to attain a significant level of power.

DE4432800 A1 (Hochtief AG) describes a wind power installation with a tower shaft from which at least one turbine projects. The wind turbine is rotatable relative to the tower shaft about a vertical axis. The entire installation is stabilized by a support body. However, if an installation of said type is installed, it is, owing to the open structure, susceptible to damage or vandalism, or very generally poses a safety risk to people and animals in the vicinity of the installation. Since wind power installations are often installed in the vicinity of agricultural facilities or in recreational areas, safety is a factor that cannot be underestimated.

US2012/051939 A1 (Up to Wind Corporation) presents a tower-shaped wind power installation. The installation has a multiplicity of relatively small-diameter turbines. The turbines are positioned in pairs on a support which is horizontal in relation to a foundation. The turbines themselves are, in US 2012/051939 A1, in the form of impellers. The entire installation can be lowered. It is also possible for wind tracking to be implemented on the basis of an asymmetrical wind load between the paired wind turbines. US 2012/051939 A1 does not disclose how or whether said wind tracking can be actively controlled otherwise than on the basis of the asymmetrical wind load. Furthermore, the wind power installation extends over a very great height. Analogously to the above-cited DE4432800 A1, the pedestal and the base of said installation are also susceptible to vandalism, and pose a safety risk to people and animals. If one additionally considers the fact that the wind turbine installation can be lowered, it is necessary, for the placement of said wind turbine installation, for a large area to be fenced and partitioned off.

It is thus an object of the present invention to provide a wind turbine installation for power generation, which wind turbine installation has a reduced installation height, and in the case of which wind turbine installation there is no need to accept power losses over and above those relating to the relative size. In particular, it is an object of the present invention to provide a wind turbine installation which overcomes at least one disadvantage of the known wind turbine installation; in particular, it is sought to provide a wind turbine installation which exhibits increased safety.

PRESENTATION OF THE INVENTION

Said object is achieved by means of a wind turbine installation according to the characterizing part of the independent claims.

One aspect of the present invention relates to a wind turbine installation for power generation. The wind turbine installation comprises a turbine support with at least two wind turbines. The installation furthermore comprises a tower console which has at least one bearing point. Said bearing point permits a rotational movement of the turbine support about the vertical axis of the turbine support and relative to a foundation. Furthermore, the wind turbine installation according to the invention comprises at least one tower pillar by means of which the turbine support is connected to the tower console. The wind turbine installation likewise comprises electronics which have an electronic controller. The electronics in the wind turbine installation are designed so as to be rotatable about the vertical axis of the turbine support relative to the foundation and relative to a power network line.

In the context of the present invention, the wind turbine may be designed as a unit comprising a nacelle which has a hub which is equipped with one or more, preferably between two and eight, rotor blades. The nacelle may also at the same time have the generator required for power generation. In the context of the present invention, a bearing point may be any mechanical element which can lead to a relative movement between two parts. In a particular embodiment, the bearing point according to the invention is a plain bearing. In a further particular embodiment, the bearing point according to the invention is a ball bearing. The selection of the bearing is basically of secondary importance to a person skilled in the art, as long as it permits the relative movement between the turbine support and the foundation.

In the context of the present invention, a foundation is to be understood to mean a component which permits a direct connection of the installation to the ground. According to the invention, the foundation may be a concrete placement or a profile or a framework. It is essential that the foundation is installed in positionally fixed and non-displaceable fashion in the ground at the intended location.

According to the invention, in a particular example, the vertical axis of the turbine support may coincide with a central vertical axis of the wind turbine installation as a whole. This will be the case in particular in symmetrical embodiments.

In a particular embodiment, the turbine support is oriented substantially horizontally in relation to the foundation or ground. In the context of the present invention, the turbine support is oriented substantially horizontally if the turbine support deviates by an angle of less than 5 degrees from a plane which is parallel to the ground or foundation. It is basically to be understood according to the invention that a horizontal is always a tangent to the horizon, regardless of the topography, that is to say individual elevations or depressions, on which the installation is constructed.

In a particular embodiment, the tower console is designed so as to be rotatable jointly with the turbine support. The tower console is thus, by way of its bearing point, mounted so as to be rotatable relative to the ground or foundation. In this embodiments of the tower console and the turbine support, and the wind turbines themselves, form a rotary unit in relation to the base or foundation.

In an alternative embodiment, the tower console is designed so as to be non-rotatable relative to the foundation. In this embodiment, the turbine support is, by way of the bearing point of the tower console, mounted so as to be rotatable relative to the latter. Said rotatable mounting would, as discussed above, be analogous to a rotation about the vertical axis of the turbine console. In this embodiment, the tower console and the foundation form, in terms of rotation, a unit relative to which the turbine support with the wind turbines is mounted so as to be rotatable.

In a particular embodiment, the wind turbine installation has, per wind turbine, at least one generator cable. In this embodiment, said generator cable is designed so as to be rotatable jointly with the turbine support. In a further particular embodiment, the generator cable runs from the wind turbines via the turbine support and through the at least one tower pillar into an interior of the tower console. In a further particular embodiment, the generator cable is completely enclosed by a component of the wind turbine installation at all times. Specifically, this means that the turbine support, and the at least one tower pillar through which the respective generator cables would run, are designed so as to enclose a cavity through which the corresponding generator cables can run.

In a particular embodiment, the electronics of the wind turbine installation furthermore comprise a yaw drive, a wind yaw tracker, a control line and an electrical line. The yaw drive is a suitable means for ensuring that the wind turbine installation can always produce the maximum possible amount of electrical energy. By means of the yaw drive, it is possible to ensure at all times that the rotors of the wind turbines are always at an optimum angle with respect to the wind direction, and to correct said angle if the wind direction changes. The wind yaw tracker is used to determine the wind direction. In a particular embodiment, the corrective angle for the yaw drive is defined from said measured wind direction by way of an algorithm.

In a particular embodiment, both the yaw drive and the wind yaw tracker are situated in the rotatably mounted part of the wind turbine installation. The yaw drive may be a component of the tower console. The wind yaw tracker should ideally be located where the wind force acts, or where the wind turbines operate. In a particular embodiment, the wind yaw tracker is located on the turbine support so as to be exposed to the same wind forces as the wind turbines themselves. In order that the wind yaw tracker can transmit measured signals to the electronics, in particular to the yaw drive, said wind yaw tracker is connected to the electronics by way of a control line. Furthermore, an electrical line may be provided which conducts useable electrical current from the electronics to the yaw drive. In a particularly preferred embodiment, said components are accommodated in the tower console, tower pillar and turbine support, respectively, so as to be substantially accessible from the outside. In the context of the present invention, a secured cable which can be accessed from the outside only by circumventing a safety measure, such as a closable box or a closable hatch, may for example be regarded as a component that is substantially inaccessible from the outside.

In a particular embodiment, the wind turbine installation comprises at least one means for transmitting electrical signals between the rotatably arranged elements and a power network line in the ground. In a particular embodiment, the wind turbine installation comprises a slip ring which serves for the transmission of electrical signals between the electronics and the power network line.

In an alternative or supplementary embodiment, the power network line is of substantially flexible form. By means of such an embodiment, it is possible to achieve that the power network line is not torn as a result of rotation of the wind turbine installation in one or the other direction. Such flexible power network lines are known to a person skilled in the art.

An output line which can rotate in the interior of a tower console is presented for example in US2012/051939 A1. By contrast, a slip ring is a known electrical engineering component for ensuring sliding contact, for power and signal transmission, between a fixed element and a rotatably mounted element.

In a particularly preferred embodiment, the slip ring is situated on the foundation of the wind turbine installation.

In a particular embodiment, the wind turbine installation according to the invention is designed so as to be closed off to the outside. In a particular embodiment, the wind turbine installation may have a door or hatch for providing access into the wind turbine installation. Said door or hatch may be designed such that it can be opened from the outside only by means of a key or some other security measure, for example a code input or a batch. In a particular embodiment, the wind turbine installation according to the invention may furthermore comprise a window which may be entirely or partially glazed and which either allows sunlight into the interior of the wind turbine installation or affords a view out of the wind turbine installation toward components, which are otherwise difficult to see, of the turbine support with the wind turbines.

A wind turbine installation system which is closed off from the outside prevents unauthorized entry to or manipulation of the wind turbine installation by third parties. Such a wind turbine installation would be better protected against vandalism. Furthermore, the risk of third parties being injured by mechanical components or movements of the wind turbine installation would be minimized.

In a further particular embodiment, the wind turbine installation comprises a climbing facility up to the turbine support. By means of this climbing facility, the entire installation is accessible for example in the event of maintenance or during mounting or dismounting of the wind turbines. The climbing facility may be realized by way of a ladder, stairs or an elevator system, in accordance with the special requirements of the technician.

In a further particular embodiment, the wind turbine installation according to the invention comprises a maintenance hatch with a cover. Through a maintenance hatch of said type, it is possible to access the interior of the wind turbine installation, or conversely, to exit the wind turbine installation again at locations that are otherwise difficult to reach from the outside. Analogously to the door or hatch above, said maintenance hatch with a cover may likewise be provided with a locking apparatus or a key system.

In a further embodiment of the wind turbine installation according to the invention, the latter comprises at least one fastening of the tower console to a foundation. In this particular embodiment, it is provided that, in the installed wind turbine installation, the fastening is in the interior, and is thus not accessible from the outside. To realize the fastening of the tower console, it is necessary for the interior of the wind turbine installation to be accessible by way of a door or hatch.

A further aspect of the present invention relates to a wind turbine installation having a tower console, wherein the turbine support with at least two wind turbines on at least one tower pillar and with electronics is, by way of a bearing point, rotatable relative to a power network line and a foundation. In a particular embodiment, the wind turbine, with a generator cable and the electronics, can rotate about the vertical axis about a bearing point. In a further particular embodiment, a wind yaw tracker with a control line and electronics is rotatable about the vertical axis by way of an electrical line and a yaw drive with a bearing point.

A further particular embodiment provides that an internal housing is provided which, with the tower pillars and the turbine support, is rotatable relative to the tower console by way of a bearing point. In a particular embodiment, an electrical connection between electronics and power network line is a slip ring. In a further particular embodiment, the electronics are connected to a flexible power network line. In a further particular embodiment, a door for entry and a window is/are provided. In a further particular embodiment, a climbing facility up to the turbine support is provided. In a further particular embodiment, a climbing facility up to the tower console can be reached via a cover. In a further particular embodiment, the fastening of the tower console is on the inside.

Further advantageous embodiments and combinations of features of the invention will emerge from the following detailed description and from the patent claims in their entirety.

BRIEF DESCRIPTION OF THE DRAWINGS

Further advantageous embodiments and combinations of features of the invention will emerge, without the invention being restricted to these, from the following detailed description and from the patent claims in their entirety.

In the FIGS..

In the FIGS., the same parts are basically denoted by the same reference signs.

Ways Of Implementing The Invention

Figure 1:
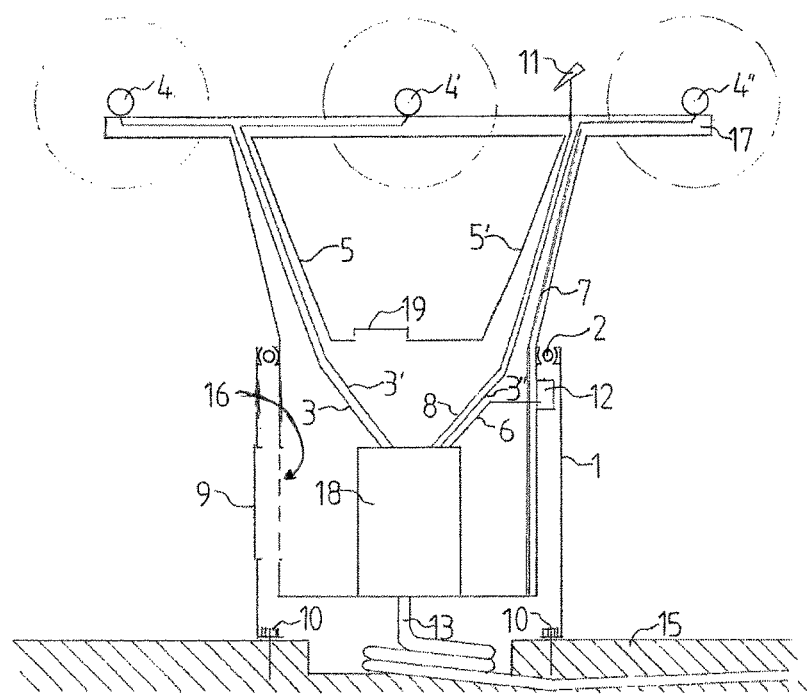
FIG. 1 schematically shows a wind turbine installation according to the invention with a turbine console mounted on the top.

FIG. 1 shows a wind turbine installation according to the invention. The wind turbine installation has a foundation 15 which has been prefabricated from sprayed concrete and on which the tower console 1 is mounted by way of fastening elements 10. The fastening elements 10 may for example be bolts, fixing screws or rivets composed of steel, which, in corresponding bores of the foundation 15, fix the tower console to the foundation by way of a flange (not specifically shown).

Situated in a depression of the foundation 15 is the power network line 13 which can feed the power generated by the wind turbine installation directly into a power network. The wind turbine installation shown here by way of example can feed directly into the power network without the power having to be processed in any other way. For this purpose, the wind turbine installation has, in the interior, electronics 18 which comprise all the major constituents required to transfer the electrical power into the power network line 13 in network-compatible form. The power network line 13 comprises a substantially flexible material which can even withstand twisting without any losses in power. The electronics 18 are furthermore connected by way of generator cables 3, 3', 3" to the generators (not shown) of the individual wind turbines 4, 4', 4". In the present embodiment, the wind turbine installation comprises a total of three wind turbines 4, 4', 4" which are arranged on a horizontal turbine support 17. The turbine support 17 is on a plane which is horizontal in relation to the foundation 15 or the ground. Likewise mounted on the turbine support 17 is a wind yaw tracker 11. This may for example be in the form of an anemometer. In this way, characteristics of the wind, such as for example wind direction and wind speed, can be measured and transmitted via a control line 8 to the electronics 18.

The electronics 18 may have a processor which calculates an optimum orientation of the wind turbine installation on the basis of the measured wind parameters transmitted to the electronics by the wind yaw tracker 11 via the control line 8. For this purpose, the electronics 18 actuate a yaw drive 12. The yaw drive 12 can, by way of a gearing, for example a toothed gearing running radially with respect to the circumference of the tower console, control the overall orientation of that part of the wind turbine installation to which the turbine support is fastened. In this way, the electronics 18 are also jointly rotated. The turbine support 17 with the turbines 4, 4', 4' thus rotates about the vertical axis of a line perpendicular to the horizontal extent of the turbine support 17. The turbine support 17 is connected to the body of the wind turbine installation by way of two tower pillars 5, 5'. The turbine support 17 and the tower pillars 5, 5' are equipped, in the interior, with line cavities through which in each case the generator cables 3, 3', 3" and the control line 8 can be connected to the electronics 18.

The tower console 1 has a bearing point for the elements of electronics, tower pillars 5, 5° and turbine support 17. By means of said bearing point, these can be rotated while the tower console itself remains positionally fixed relative to the foundation 15. Since the electronics 18 rotate, the power transmission cable 13 must be of flexible form.

In this exemplary embodiment, the wind turbine installation is equipped with a door 9 through which, for example, maintenance personnel can enter the interior of the wind turbine installation and gain access to the electronics 18 via aligned access 16 schematically illustrated in the rotational part of the installation on which the turbine support is fastened. A window 19 on the top side of the turbine installation body affords a view of the wind turbines 4, 4', 4".

Figure 2:
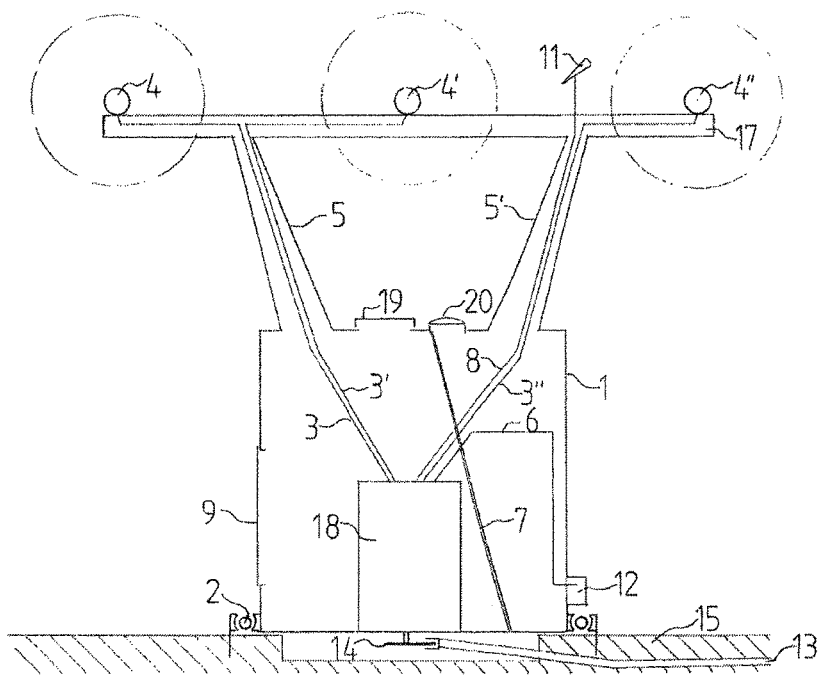
FIG. 2 schematically shows a wind turbine installation according to the invention, in the case of which the turbine console is mounted on the foundation.

FIG. 2 shows an alternative embodiment of the wind turbine installation according to the invention. Said wind turbine installation likewise comprises a total of three wind turbines 4, 4', 4" which are arranged on a horizontal turbine support 17.

The wind turbines 4, 4' and 4" are equipped with generators which generate electrical power from the wind energy (not shown). To conduct the electrical current away from the wind turbines 4, 4', 4", generator cables 3, 3', 3" are provided, wherein a respective generator cable 3, 3', 3" is provided for each wind turbine 4, 4', 4". Said generator cables 3, 3', 3" conduct the power to central electronics 18. In this embodiment, a yaw drive 12 is likewise provided, to which electrical power is supplied by the electronics 18 via an electrical line 6. By contrast to FIG. 1, the yaw drive is, in this embodiment, in the vicinity of the foundation.

The wind turbine installation shown here also comprises a turbine console 1 which has bearing points 2 on the foundation 15. Said bearing points permit rotation of the tower console 1, and together therewith the entire arrangement of wind turbines 4, 4', 4", about the vertical axis of the turbine console 1 relative to the foundation 15. To nevertheless enable the electrical energy obtained to be conducted away, a slip ring 14 is provided which, in the present embodiment, is situated in a depression of the foundation 15 and which, there, realizes a slip connection to the power network line 13.

This embodiment, too, provides a door 9 which provides access to the interior of the tower console 1 and enables maintenance personnel to access the electronics 18. The wind turbine installation shown furthermore comprises a climbing facility 7 by which a maintenance hatch 20 with a cover on the roof of the turbine console 1 can be reached. In this way, a maintenance technician can also gain access to the turbine support 17 and the wind turbines 4, 4', 4". To be better able to access these, steps may be provided along the tower pillars 5, 5'.

With the wind turbine installation shown, it is possible to provide wind turbine installations which are altogether more compact and safer but which are no less powerful.

The invention claimed is:

1. A wind turbine installation for power generation, comprising:
   a fixed foundation;
   a turbine support comprising a lower portion adjacent said fixed foundation and an upper portion supporting two or more turbines, wherein said upper and lower portions are jointly rotatable about a vertical axis with respect to said fixed foundation;
   wherein the upper portion of said turbine support is oriented substantially horizontally relative to the foundation;
   electronics comprising an electronic controller mounted within said lower portion of said turbine support and rotatable with said lower portion of said turbine support about said vertical axis; and
   an access opening in said lower portion of said turbine support adjacent to said foundation configured to provide personnel access to said lower portion of said turbine support and to said electronics in said lower portion.

2. The wind turbine installation as claimed in claim 1, further comprising, per wind turbine, at least one generator cable which is rotatable jointly with the turbine support.

3. The wind turbine installation as claimed in claim 1, further comprising a slip ring for transmitting power between the electronics and a power network line associated with the fixed foundation for the transmission of electrical signals.

4. The wind turbine installation as claimed in claim 1, further comprising a power network line of substantially flexible form associated with said foundation and connected to the lower portion of said turbine support.

5. The wind turbine installation as claimed in claim 1, further comprising a window providing visual access to the interior of said turbine support.

6. The wind turbine installation as claimed in claim 1, the lower portion of said turbine support further comprising a maintenance hatch with a cover.

7. A wind turbine installation according to claim 1, further comprising
   a stationary console adjacent said fixed foundation surrounding said lower portion of said turbine support, said stationary console comprising an access door configured to provide personnel access to said lower rotatable portion of said turbine support and to said electronics in said lower portion.

8. The wind turbine installation as claimed in claim 1, wherein the electronics comprise a wind yaw tracker, and further comprise a yaw drive mounted within the rotatable lower portion of said turbine support and a control and electrical line connected between said electronics controller and said yaw drive.

* * * * *